United States Patent
Horstman et al.

(10) Patent No.: US 7,996,952 B2
(45) Date of Patent: Aug. 16, 2011

(54) WIPER ARM ASSEMBLY HAVING A LOCKING CATCH

(75) Inventors: Patrick Horstman, Royal Oak, MI (US); Alan J. Stahlhut, Valparaiso, IN (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 408 days.

(21) Appl. No.: 11/877,929

(22) Filed: Oct. 24, 2007

(65) Prior Publication Data

US 2008/0098555 A1    May 1, 2008

Related U.S. Application Data

(60) Provisional application No. 60/863,000, filed on Oct. 26, 2006.

(51) Int. Cl.
     *B60S 1/34*      (2006.01)
(52) U.S. Cl. .............................. 15/250.352; 15/250.351
(58) Field of Classification Search ............. 15/250.351, 15/250.352, 250.31, 250.19
See application file for complete search history.

(56) References Cited

U.S. PATENT DOCUMENTS

| | | | |
|---|---|---|---|
| 3,729,767 A | 5/1973 | Edele et al. | |
| 4,170,804 A * | 10/1979 | Scotcher | 15/250.34 |
| 4,251,899 A | 2/1981 | Hoyler | |
| 4,564,971 A | 1/1986 | Pethers et al. | |
| 4,704,761 A | 11/1987 | South et al. | |
| 4,741,068 A | 5/1988 | Roth | |
| 4,991,251 A | 2/1991 | Egner-Walter et al. | |
| 5,079,793 A | 1/1992 | Shirato | |
| 5,165,159 A | 11/1992 | Egner-Walter et al. | |
| 5,435,042 A | 7/1995 | Arai et al. | |
| 6,223,778 B1 | 5/2001 | Bucher et al. | |
| 6,394,688 B1 | 5/2002 | Kraemer | |
| 6,553,608 B2 | 4/2003 | Kraus et al. | |
| 6,640,381 B1 * | 11/2003 | Zimmer | 15/250.352 |
| 6,658,691 B2 | 12/2003 | Muramatsu | |
| 6,782,581 B2 | 8/2004 | Block | |
| 2003/0110587 A1 * | 6/2003 | Ritt | 15/250.352 |
| 2004/0025282 A1 | 2/2004 | Zimmer et al. | |

FOREIGN PATENT DOCUMENTS

| | | | |
|---|---|---|---|
| EP | 0755833 | * | 1/1997 |
| JP | 63017149 | | 1/1988 |
| JP | 10129424 | | 5/1998 |
| JP | 2001010450 | | 1/2001 |
| JP | 2001080466 | | 3/2001 |
| JP | 2004249823 | | 9/2004 |
| JP | 2006240364 | | 9/2006 |

* cited by examiner

*Primary Examiner* — Gary K Graham
(74) *Attorney, Agent, or Firm* — Robert L. Stearns; Dickinson Wright, PLLC

(57) ABSTRACT

A wiper arm assembly and method of assembly thereof includes a mounting head and a wiper arm configured for relative rotation during assembly from a disassembled position to a shipping position, wherein the wiper arm and mounting head are locked against rotation toward the disassembled position once in the shipping position. The mounting head and wiper arm have locking surfaces configured for locked engagement with one another while in the shipping position. The locking surfaces are brought into engagement with one another by a force imparted by a spring while rotating the mounting head relative to the wiper arm from the disassembled position toward the shipping position. When in the shipping position, the locking surfaces confront each other and prevent the mounting head and the wiper arm from rotating back toward the disassembled position from the shipping position.

10 Claims, 7 Drawing Sheets

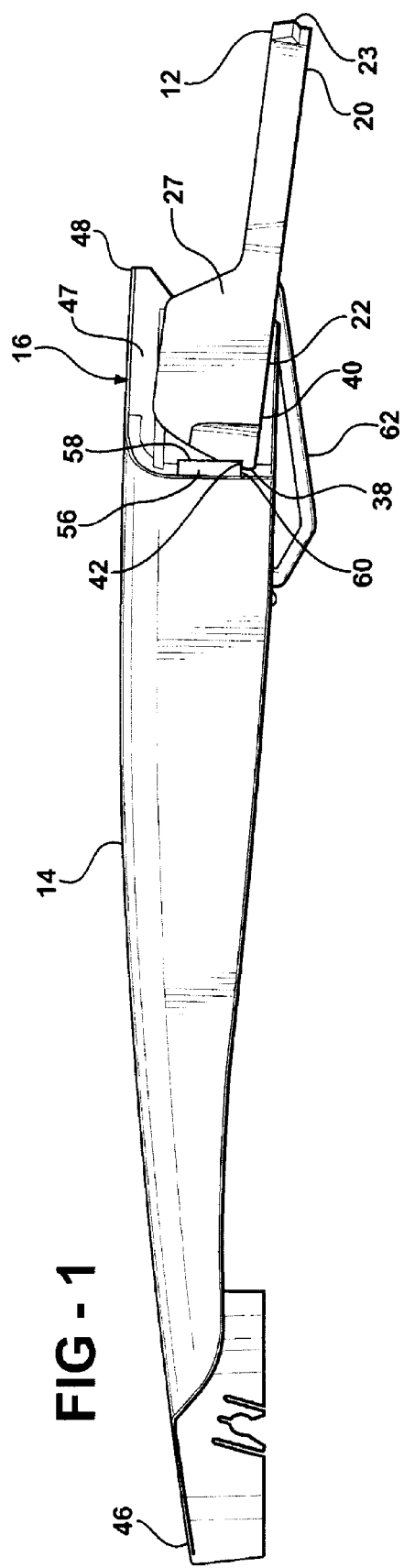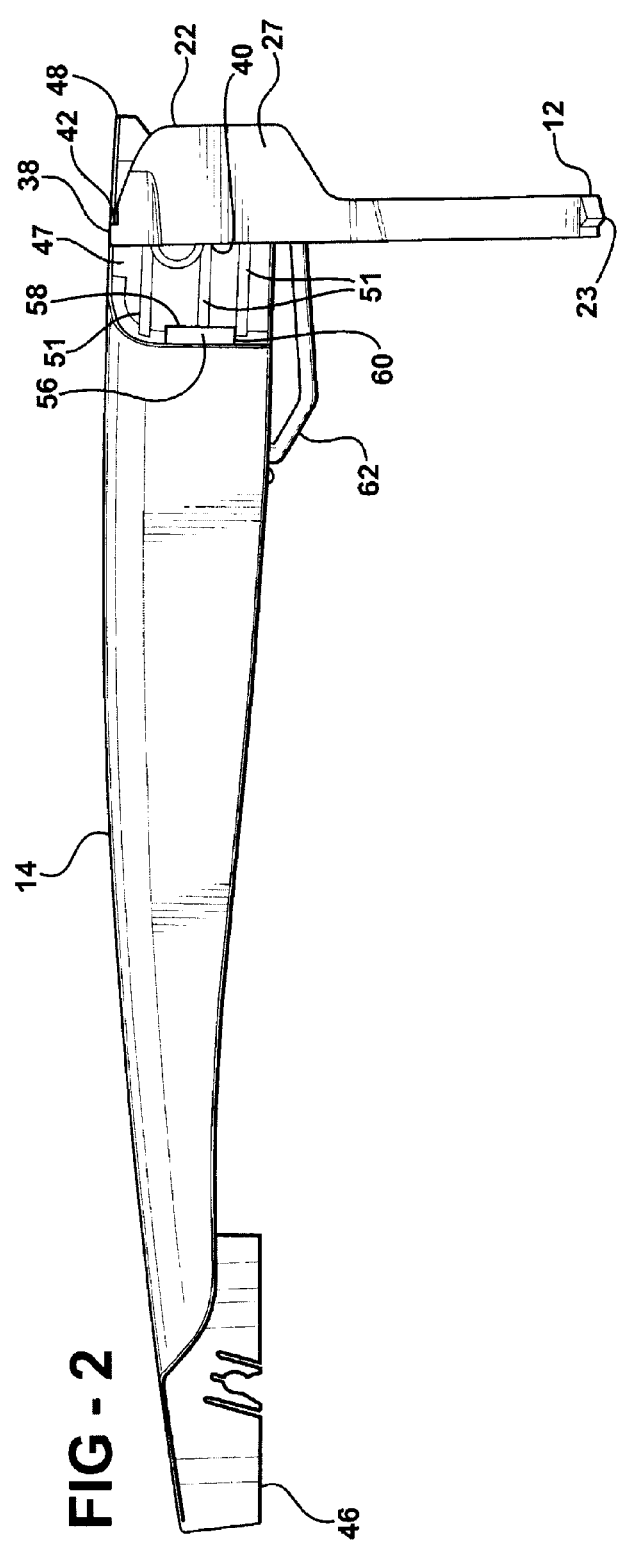

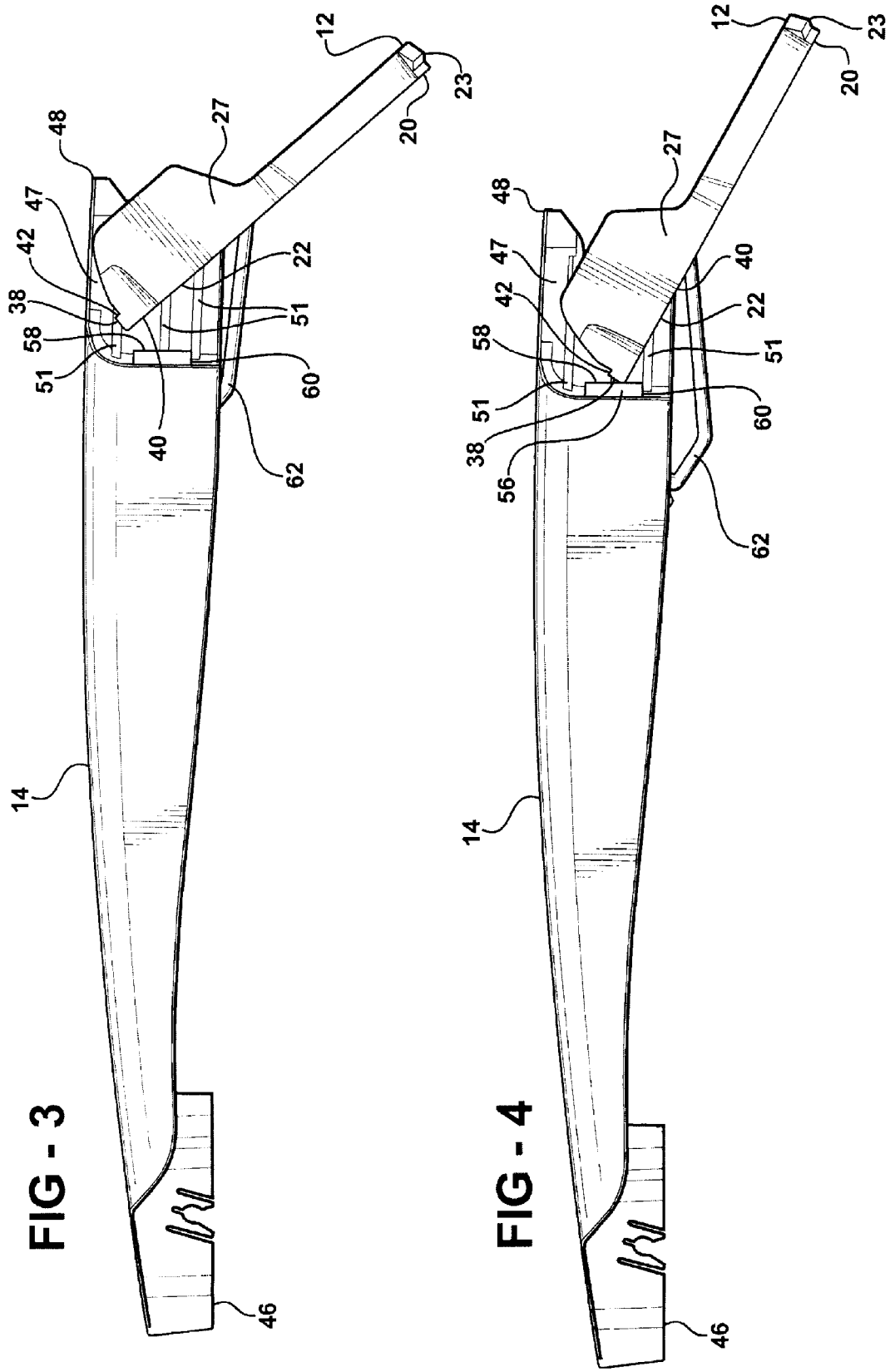

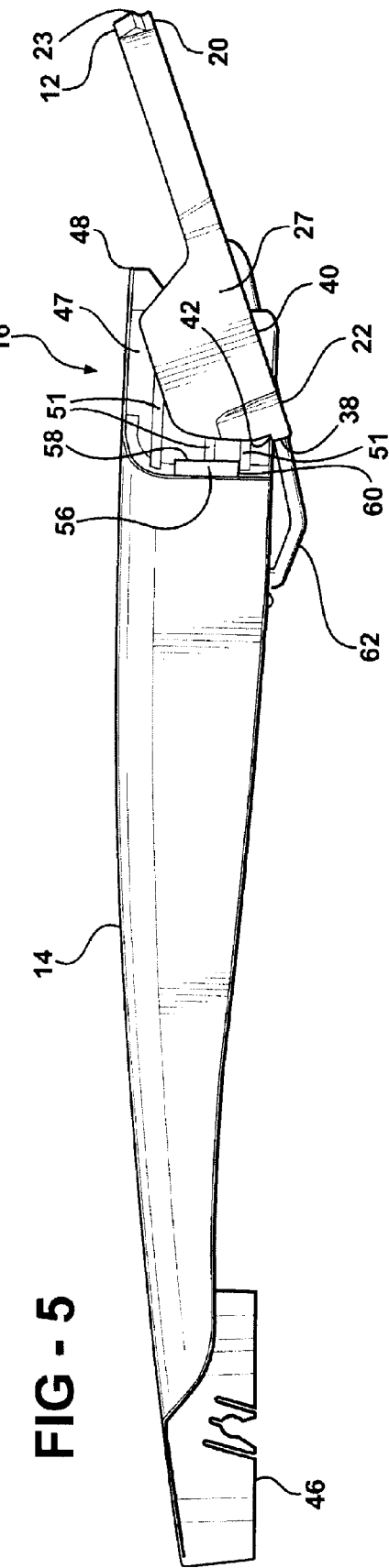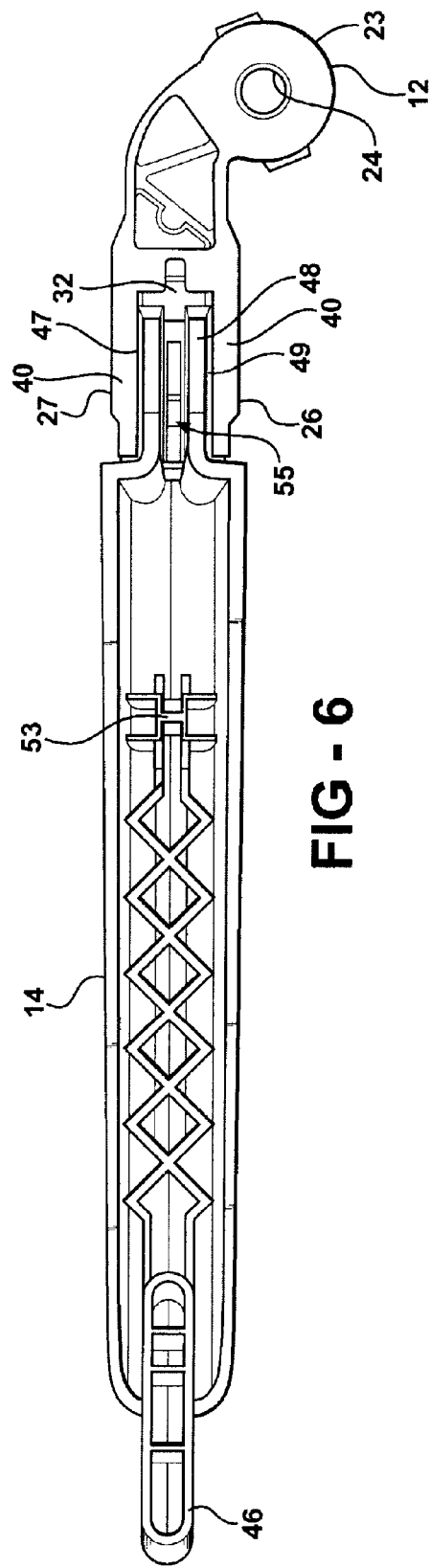
FIG - 5
FIG - 6

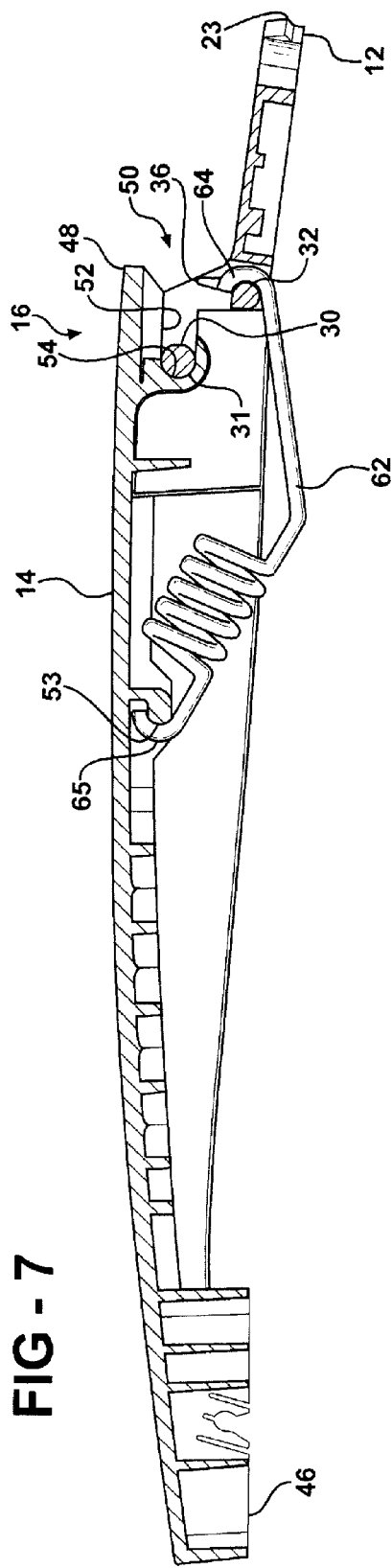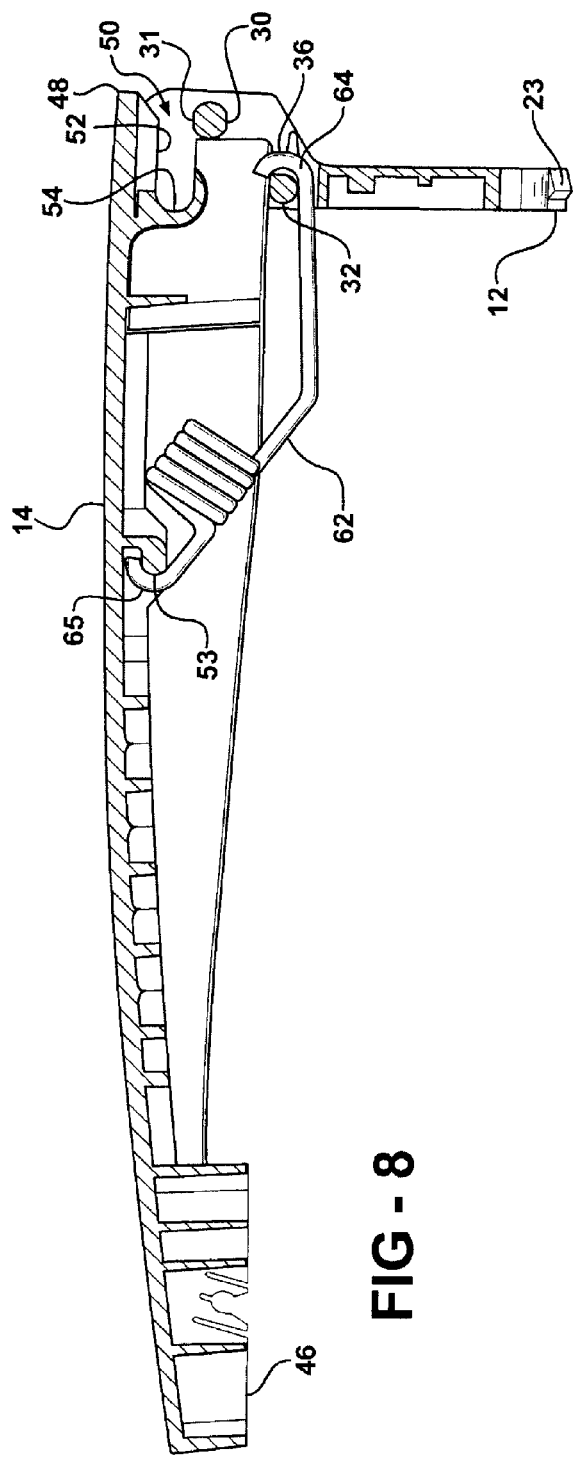
FIG - 7
FIG - 8

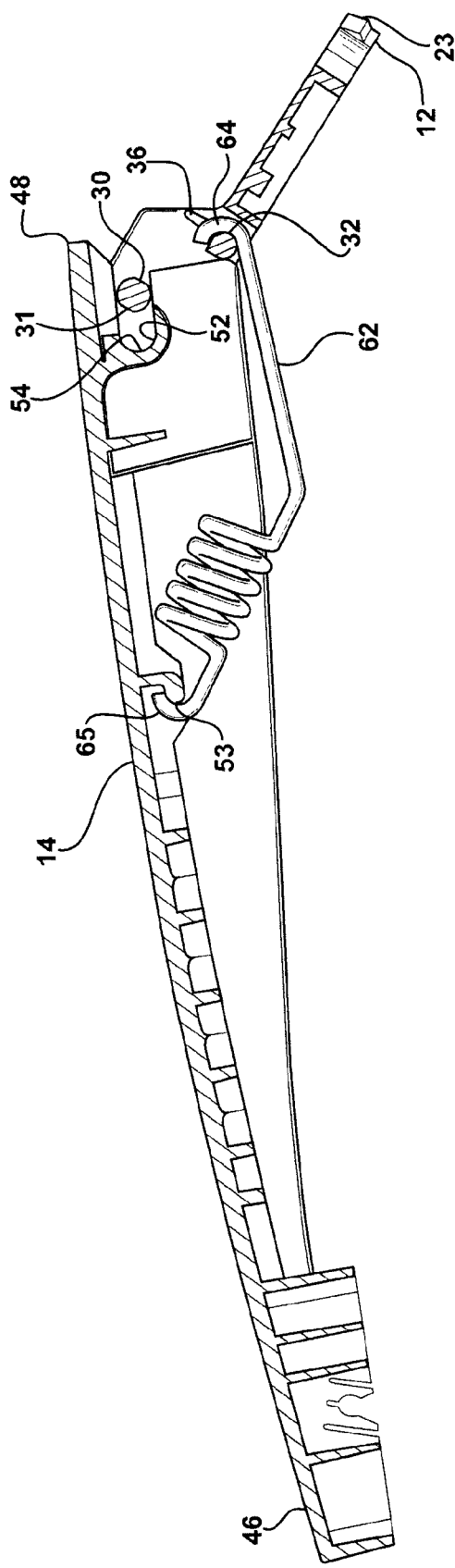
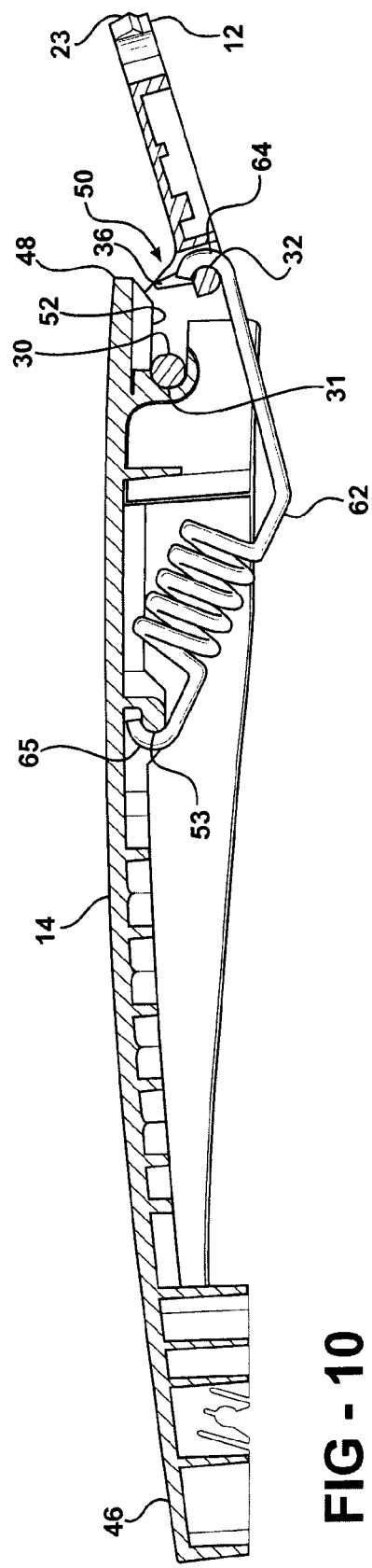
FIG-9
FIG-10

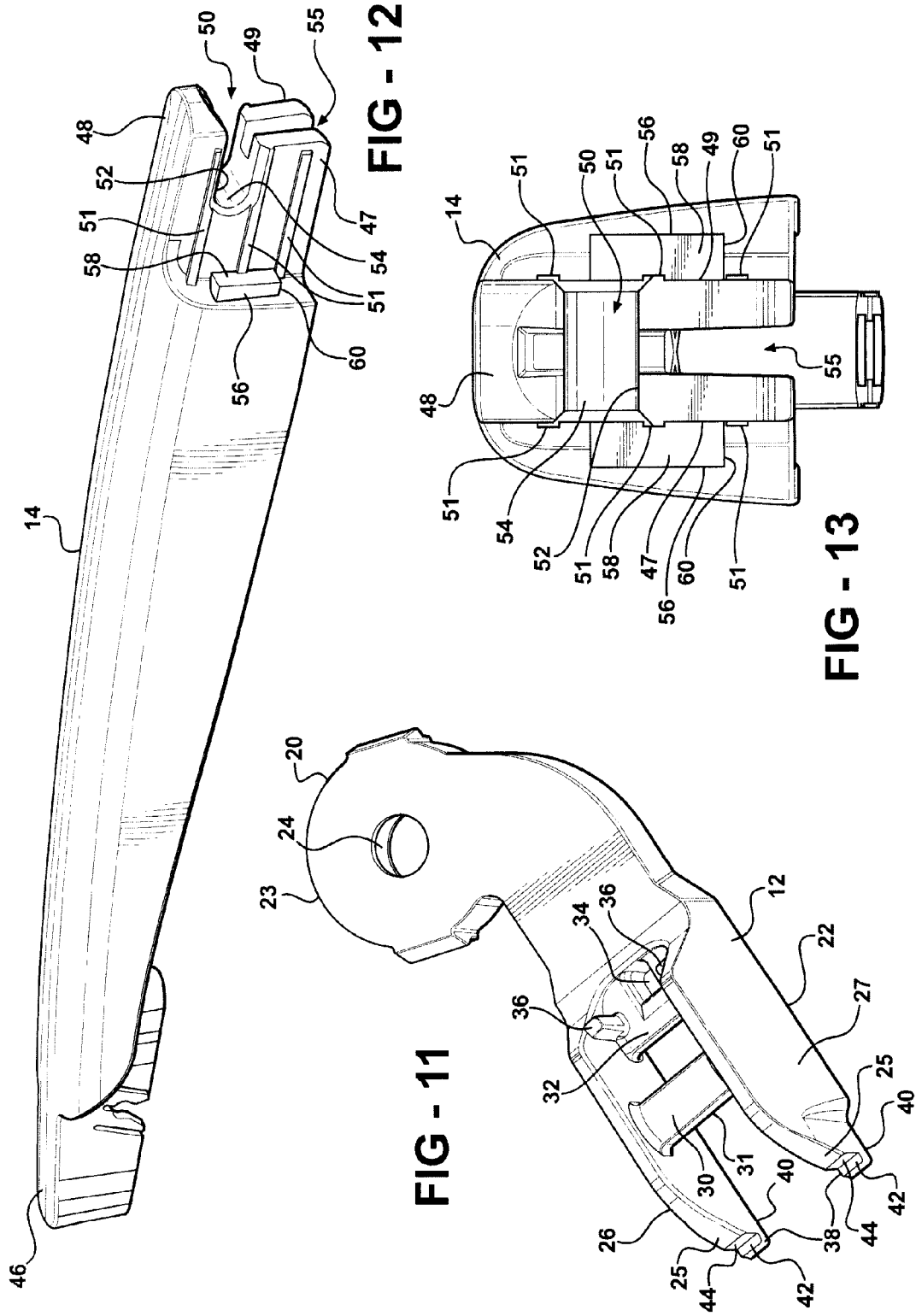

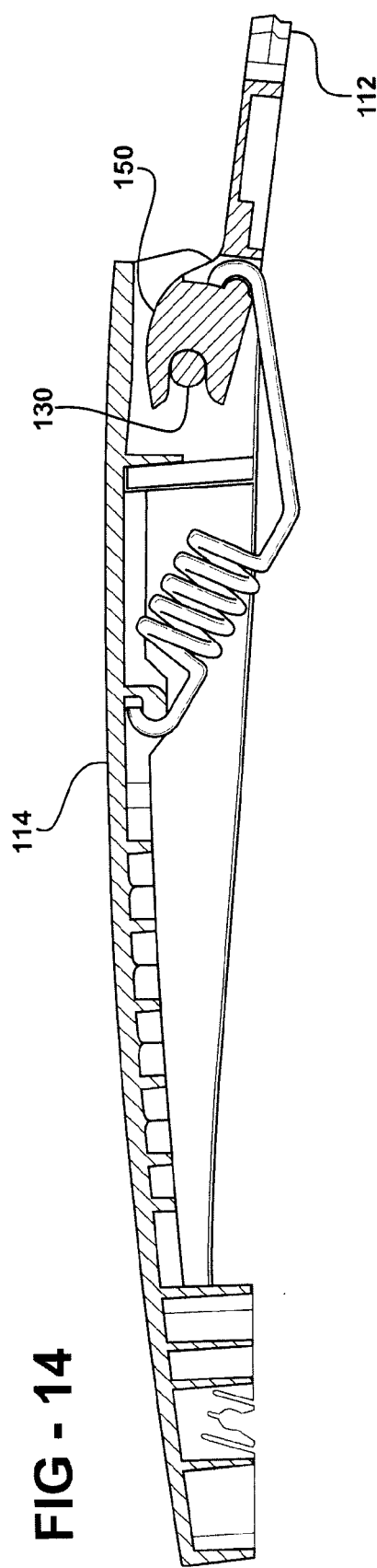
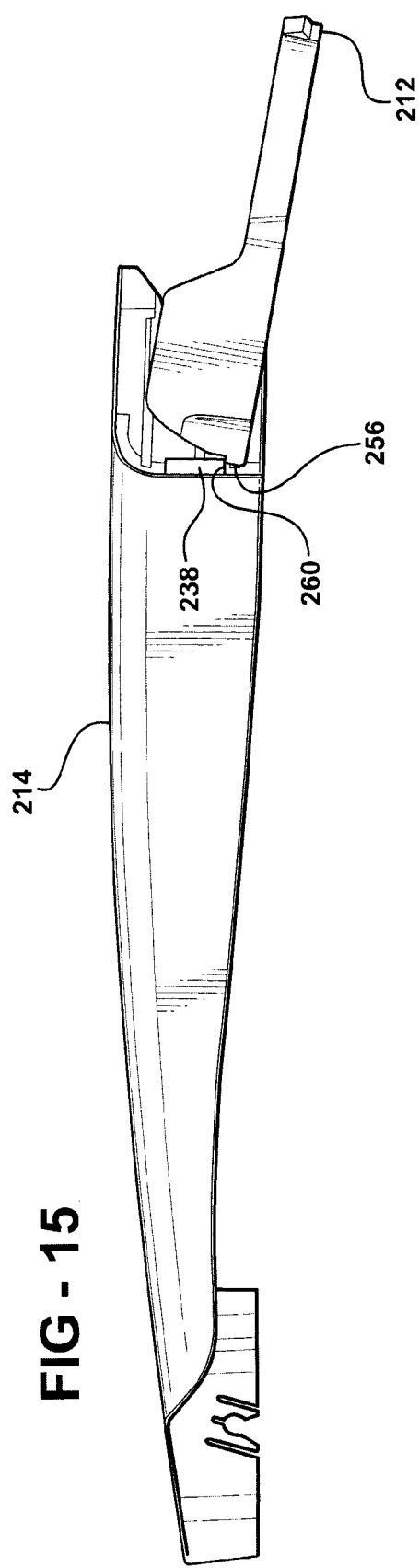
FIG - 14
FIG - 15

WIPER ARM ASSEMBLY HAVING A LOCKING CATCH

CROSS-REFERENCE TO RELATED APPLICATION

This application claims the benefit of U.S. Provisional Application Ser. No. 60/863,000, filed Oct. 26, 2006, which is incorporated herein by reference in its entirety.

BACKGROUND OF THE INVENTION

1. Technical Field

This invention relates generally to wiper arm assemblies for vehicles, and more particularly to wiper arm assemblies having a mounting head for attachment to a vehicle and a wiper arm attached for articulation relative to the mounting head, and methods of assembly thereof.

2. Related Art

Wiper arm assemblies for vehicles are known to have a wiper arm hinged for articulation relative to a mounting head. The mounting head facilitates attachment of the assembly to a surface on the vehicle so that a wiper blade attached to the wiper arm is suitably positioned for oscillation against a window. The wiper arm and wiper blade attached thereto can generally be articulated relative to the mounting head away from the window to a service-up position to facilitate replacing the wiper blade.

It is known to manufacture wiper arm assemblies with the mounting head and wiper arm permanently fixed to one another by a staked pin or rivet. In this type of construction, the pin or rivet is assembled between axially aligned openings in the mounting head and wiper arm, and then the pin or rivet is fixed therein to permanently couple the parts together sot that they can not be taken apart thereafter. At some point in assembly, one end of a coil spring is attached to the mounting head, and an opposite end of the coil spring is attached to the wiper arm. The force imparted by the coil spring maintains the wiper blade in wiping engagement with the window as the mounting head is oscillated by a drive motor. The spring also allows the wiper arm to be articulated away from the window by manually lifting the wiper arm, such that the wiper blade can be serviced, as necessary. Though this type of wiper arm assembly works well in use, it typically comes with increased cost in manufacturing and assembly due to the added cost associated with the pin or rivet and the processes for permanently fixing the mounting head and wiper arm together.

It is also known to manufacture wiper arm assemblies with the mounting head and wiper arm attached to one another such that they can be disassembled from one another after being assembled in a "preassembled" position. A preassembled position is defined when the mounting head and wiper arm are attached together, but not yet assembled to a vehicle. In one known construction, as disclosed in the prior art section of U.S. Pat. No. 6,553,608 (the '608 patent), the mounting head and wiper arm are attached together under a preload of a tension spring, with an axle on one of the parts being received to form a hinged connection in an open hub of the other part. Bearing surfaces on the mounting head and wiper arm are pulled into engagement with one another along a line of force imparted by the tension spring. The opposing reaction forces between the bearing surfaces act to maintain the mounting head and wiper arm in the preassembled position until the wiper arm assembly is fully assembled to a vehicle. Unfortunately, the bearing surfaces are not prevented from moving back toward a disassembled direction and can slide relative to one another under a minimal force, which can occur during transport or during careless handling, whereupon the mounting head and wiper arm can become inadvertently disassembled.

To combat the problem of inadvertent disassembly set out in the prior art section of the '608 patent, the '608 patent teaches forming the bearing surfaces as being arranged to define interacting camming surfaces. In order for the mounting head and wiper arm to be disassembled from their preassembled position, the bearing surfaces require the spring attaching the mounting head and the wiper arm to be increased in length, thus requiring an increased tensile force to be overcome prior to the parts becoming disassembled from one another. Upon the bearing surfaces overcoming a cam lobe, the point at which the tensile spring is at its greatest length, the length of the spring is allowed to decrease, thereby causing a tensile force imparted by the spring to disassemble the mounting head and the wiper arm from one another. Accordingly, the '608 patent teaches that the mounting head can still be disassembled from the wiper arm by rotating the wiper arm relative to the mounting head toward the disassembled direction with a sufficient torque to overcome the cam lobe.

SUMMARY OF THE INVENTION

A wiper arm assembly has a mounting head and a wiper arm for relative rotation therewith, wherein the wiper arm and mounting head are locked against disassembly upon be assembled to a shipping position. The mounting head has one of an axle or a hub, while the wiper arm has the other of the axle or hub, wherein the hub has a pocket with an open end for receipt of the axle for oscillation therein. The mounting head has one end configured for attachment to a vehicle and an opposite end with a first locking surface extending therefrom. The wiper arm has opposite sidewalls with a second locking surface extending laterally outwardly from at least one of the sidewalls. A spring is arranged for operable attachment to the mounting head and the wiper arm. The locking surface on the wiper arm is configured for engagement with the locking surface on the mounting head under a force imparted by the spring while rotating the mounting head relative to the wiper arm from a disassembled position toward a shipping position. The locking surfaces confront each other while in the shipping position and prevent the mounting head and said wiper arm from rotating back toward the disassembled position from the shipping position.

Another aspect of the invention provides a method of assembling a wiper arm assembly. The method starts with providing a mounting head and a wiper arm. The mounting head is provided having one of an axle or a hub, with the hub be configured with an open pocket for receipt of the axle for rotation therein. The mounting head is further provided with one end configured for attachment to a vehicle and an opposite end having a first locking surface extending therefrom. The wiper arm is provided having the other of the axle or hub and having opposite sidewalls with a second locking surface extending laterally outwardly from at least one of the sidewalls. Then, attaching a spring to the mounting head and the wiper arm, and rotating the mounting head and the wiper arm relative to one another from a disassembled position toward a shipping position and causing the spring to initially increase in preload and the axle to be received in said hub. Next, snapping the locking surfaces on the mounting head and the wiper arm into engagement with one another and into the shipping position under a force imparted by the spring during the rotating step, whereupon the locking surfaces prevent the mounting head and the wiper arm from rotating back toward the disassembled position.

According to yet another aspect of the invention, another method of assembling a wiper arm assembly from a disassembled position to a shipping position is provided. The method includes providing a wiper arm having a locking surface; a mounting head having a locking surface and a spring. Then, attaching the spring to the wiper arm and the mounting head and imparting a preload in the spring by rotating the wiper arm and the mounting head relative to one another. Next, bringing the locking surfaces of the wiper arm and the mounting head into snapping engagement with one another under the preload of the spring, wherein the preload maintains the locking surfaces in confronting abutment with one another while in the shipping position and prevents the wiper arm and the mounting head from being rotated back toward the disassembled position.

Accordingly, a wiper arm assembly constructed in accordance with the invention, by way of example and without limitation, provides a wiper arm assembly that is easy to assemble, is economical in manufacture, is prevented from becoming disassembled during unintended relative rotation between the mounting head and wiper arm, and has a long and useful life.

BRIEF DESCRIPTION OF THE DRAWINGS

These and other aspects, features and advantages of the present invention will become readily appreciated when considered in connection with the following detailed description of presently preferred embodiments and best mode, appended claims and accompanying drawings, in which:

FIG. 1 is a side view of a wiper arm assembly constructed according to one presently preferred embodiment of the invention shown in a shipping position;

FIG. 2 is a side view of the wiper arm assembly shown in a disassembled position;

FIG. 3 is a side view of the wiper arm assembly shown in a partially assembled position between the disassembled and shipping positions;

FIG. 4 is a side view of the wiper arm assembly shown just prior to snapping into the shipping position;

FIG. 5 is a side view of the wiper arm assembly shown in a service-up position;

FIG. 6 is a bottom view of the wiper arm assembly with a spring removed;

FIG. 7 is a partial cross-sectional view taken generally along a central axis of the wiper arm assembly while in the shipping position;

FIG. 8 is a view similar to FIG. 7 while in the disassembled position;

FIG. 9 is a view similar to FIG. 7 while in the partially assembled position;

FIG. 10 is a view similar to FIG. 7 while in the service-up position;

FIG. 11 is a perspective view of a mounting head of the wiper arm assembly;

FIG. 12 is a perspective view of a wiper arm of the wiper arm assembly;

FIG. 13 is an end view of the wiper arm;

FIG. 14 is a cross-sectional view taken generally along a central axis of a wiper arm assembly constructed in accordance with another embodiment of the invention; and FIG. 15 is a side view of a wiper arm assembly constructed in accordance with yet another alternate embodiment of the invention.

DETAILED DESCRIPTION OF PRESENTLY PREFERRED EMBODIMENTS

Referring in more detail to the drawings, FIGS. 1-6 show a wiper arm assembly 10 constructed according to one presently preferred embodiment of the invention. The wiper arm assembly 10 has a mounting head 12 to facilitate attachment of the assembly 10 to a vehicle, and a wiper arm 14 for operable attachment of a wiper blade (not shown) to the assembly 10. The wiper arm 14 is attached for articulated movement to the mounting head 12 via a hinged joint 16 so that the wiper arm 14 can be pivoted in use and during assembly to a vehicle between a preassembled or shipping position (FIGS. 1 and 7) and a fully assembled position (not shown), wherein the assembly 10 is mounted to a vehicle. While in the shipping position, a locking mechanism 18 acts between the mounting head 12 and wiper arm 14 to prevent them from being pivoted from the shipping position back toward a disassembled position (FIGS. 2 and 8). Accordingly, the wiper arm assembly 10 is prevented from becoming inadvertently disassembled, such as during shipping or while being handled prior to being attached to the vehicle.

As best shown in FIG. 11, the mounting head 12 extends between opposite ends 23, 25 and has a mounting portion 20 adjacent the end 23 and a hinge portion 22 adjacent the end 25. The mounting portion 20 preferably has an opening 24 to facilitate attachment of the assembly 10 to the vehicle via a standard fastener. The hinge portion 22 is configured to allow the wiper arm 14 to articulate relative to the mounting head 12. The mounting head 12 has a pair of laterally spaced sidewalls 26, 27 defining a generally open channel 28 therebetween. An axle 30 of a predetermined diameter extends between the sidewalls 26, 27. The axle 30 preferably defines a generally cylindrical bearing surface 31 facing the end 25 and being spaced a predetermined distance from the end 25. The mounting head 12 has a spring attachment feature, represented here, by way of example and without limitations, as a spring pin 32, extending between the sidewalls 26, 27. To further define the attachment feature, a through opening 34 is preferably formed adjacent the spring pin 32. The spring pin 32 is located generally between the axle 30 and the mounting portion 20. The mounting head 12 preferably has at least one, and shown here as a pair of stop surfaces 36 (FIG. 7-11) arranged to limit the degree of pivot of the wiper arm 14 upwardly from the mounting head, from the fully assembled position while on the vehicle to the service-up position (FIGS. 5 and 10). It should be recognized that the degree of movement between the assembled position and the service-up position can be varied, as desired, by altering the stop surfaces 36.

As shown in FIG. 11, the locking mechanism 18 is defined in part on the mounting head 12 by at least one, and shown here as a pair of protrusions, referred to hereafter as locking catches 38, extending from the ends 25 of the sidewalls 26, 27 and generally coplanar thereto adjacent bottom surfaces 40 of the sidewalls 26, 27. The bottom surfaces 40 are preferably substantially flat or planar for mounting engagement with a vehicle surface, although they could be formed having any suitable surface contour. The locking catches 38 have generally flat locking surfaces 42 provided in part by generally flat recessed surfaces 44 extending into the ends 25 of the sidewalls 26, 27. The locking surfaces 42 are represented here, by way of example and without limitation, as being substantially perpendicular to the recessed surfaces 44 and substantially parallel to the bottom surfaces 40.

As best shown in FIG. 12, the wiper arm 14 has an elongate body extending longitudinally between opposite ends 46, 48, with one end 46, for example, being configured for attachment to the wiper blade, and the other end 48 being configured for pivotal attachment to the mounting head 12. To facilitate operable attachment of the wiper arm 14 to the mounting head 12, the wiper arm 14 has a spring attachment feature, shown here as a spring hook 53 (FIGS. 6-10), attached to a bottom or underside surface of the wiper arm 14, wherein the spring hook 53 can be formed as a single piece of material with the wiper arm 14, such as in a molding process, for example.

The end 48 of the wiper arm has a pair of sidewalls 47, 49 laterally spaced from one another with a centrally extending spring channel 55 located between the sidewalls 47, 49. The sidewalls 47, 49 have outer surfaces arranged for close receipt within the hinge portion 22 of the mounting head 12 between its laterally spaced sidewalls 26, 27. To minimize friction in use, the sidewalls 47, 49 can have protrusions extending outwardly therefrom a predetermined distance, represented here, by way of example and without limitation, as longitudinal ribs 51 extending generally along a length direction of the sidewalls 47, 49.

The end 48 of the wiper arm is shown as having a hub 50, preferably formed as a monolithic piece of material with the wiper arm 14, although it could be formed as a separate piece and attached thereafter. The hub 50 has a pocket 52 extending into the end 48 of the wiper arm 14 a predetermined distance along the length of the hub 50 to a closed seating surface 54. The pocket 52 and opening formed at the end 48 is preferably sized for close receipt of the axle 30, such that the axle 30 is free to oscillate within the pocket 52. The seating surface 54 can be formed having a generally cylindrical or constant radius, concave contour to conform generally to the convex cylindrical bearing surface 31 on the axle 30. At least one, and preferably a pair of locking features, represented here by protrusions 56, for example, extend laterally away or outwardly from the sidewalls 47, 49, wherein the protrusions 56 can be attached to or spaced from the sidewalls 47, 49. The protrusions 56 have front abutting surfaces, referred to hereafter as front surfaces 58 facing the end 48 for abutment with the locking catches 38 during assembly and lower locking surfaces, referred to hereafter as stop surfaces 60, configured for mating, confronting engagement with the locking surfaces 42 on the mounting head 12. The front surfaces 58 and stop surfaces 60 are shown here as being generally perpendicular to one another.

To assemble the mounting head 12 to the wiper arm 14, a spring, shown here as a coil spring 62, is attached and tensioned between the mounting head 12 and the wiper arm 14. To facilitate attachment of the coil spring 62 to the respective attachment locations on the mounting head 12 and wiper arm 14, the coil spring 62 has hooked, generally c-shaped opposite ends 64, 65, with one end 64 being attached to the spring pin 32 of the mounting head 12 and the other end 65 being attached to the spring hook 53 of the wiper arm 14. Upon first attaching the coil spring 62, the wiper arm assembly 10 is in its disassembled position (FIGS. 2 and 8) and the axle 30, which is located between the locking surface 42 and the end 20, is preferably placed in abutting contact with the end 48 of the wiper arm 14 adjacent the pocket 52 of the hub 50. While in the disassembled position, the wiper arm assembly 10 is able to be readily taken apart, and can generally fall apart if not handled properly.

To proceed in assembly, the mounting head 12 and wiper arm 14 are rotated relative to one another, with the mounting head 12 being moved counter clockwise, as viewed in FIGS. 3 and 9, wherein the mounting head 12 and wiper arm 14 are shown in a partially assembled position. In this position, the axle 30, which is located between the locking surfaces 42 and the end 23, begins to enter the pocket 52, and the coil spring 62 is increased in length, thus, increasing the tension force in the spring 62. The mounting head 12 and wiper arm 14 are rotated further in assembly and the axle 30 is received in the pocket 52 so that the tension imparted by the coil spring 62 pulls or biases the axle 30 toward the seating surface 54. The locking catches 38 first abut the front surfaces 58 of the protrusions 56 (FIG. 4), and the axle 30 remains spaced from the seating surface 54 and the locking surfaces 42, 60 remain out of engagement with one another. Accordingly, in this position, the assembly can still be freely rotated back toward the disassembled position, if desired. As the mounting head 12 and wiper arm 14 are rotated further relative to each other, the locking catches 38 clear the respective front surfaces 58 and snap toward the wiper arm 14 under the tension and bias of the coil spring 62 (FIG. 1). Accordingly, the tension in the coil spring 62 decreases, since the length between its ends is decreased, and the assembly is brought into the shipping position. With the wiper arm assembly 10 now in the shipping position, the recessed surfaces 44 on the mounting head 12 can be configured to engage the front surfaces 58 on the protrusions 56, and the locking surfaces 42 on the mounting head 12 engage the stop surfaces 60 on the protrusions 56. Accordingly, the mounting head 12 and the wiper arm 14 are prevented from being rotated back toward the disassembled position by the respective locking and stop surfaces 42, 60. Therefore, once in the shipping position, the wiper arm assembly 10 is generally locked against disassembly without the aid of tools. When the wiper arm 14 is assembled in the shipping position, the bearing surface 31 of the axle 30 can be configured to seat against the seating surface 54 while the locking mechanism 18 is engaged, though it is possible that a slight gap could be present.

As shown in FIG. 5, when the wiper arm assembly 10 is assembled to the vehicle, the wiper arm 14 can be rotated further in a counter clockwise direction (the same direction of rotation used to assembly the mounting head 12 to the wiper arm 14) relative to the mount head 12 into the service-up position. During rotation toward the service-up position, the axle 30 preferably remains seated against the seating surface 54. While in the service-up position, the wiper arm 14, and thus, the wiper blade are moved away from the vehicle window.

Obviously, many modifications and variations of the present invention are possible in light of the above teachings. For example, as shown in FIG. 14, it should be recognized that the axle 30 and the hub 50 could be constructed in the reverse orientation. Accordingly, an axle 130 could be attached to a wiper arm 114, and a hub 150 could be formed or attached on a mount head 112. Similarly, as shown in FIG. 15, the structure of the locking mechanism 18 could be reversed. Accordingly, a locking catch 238 could be attached on a wiper arm 214, and protrusions 256 and associated stop surfaces 260 could be attached to a mount head 212. It is, therefore, to be understood that within the scope of the appended claims, and any other claims allowed which stem from this application, that the invention may be practiced otherwise than as specifically described and shown.

What is claimed is:

1. A wiper arm assembly having a disassembled position, an assembled position, a service-up position and a shipping position, said assembled position being between said shipping position and said service-up position and said shipping position being between said disassembled position and said assembled position, comprising:
  a mounting head having an axle or said mounting head having one end configured for attachment to a vehicle and an opposite end having a first locking surface extending therefrom;
  a wiper arm having a hub comprising an open pocket for receipt of said axle for rotation therein, and having opposite sidewalls spaced from one another by a channel extending between said sidewalls with a second locking surface extending laterally outwardly from at least one of said sidewalls externally to said channel;
  a spring configured for operable attachment to said mounting head and said wiper arm; and
  said locking surface on said wiper arm being configured for engagement with said locking surface on said mounting head under a force imparted by said spring while rotating said mounting head relative to said wiper arm from said disassembled position toward said shipping position, said locking surfaces confronting each other while in said shipping position and preventing said mounting head and said wiper arm from rotating back toward said disassembled position from said shipping position.

2. The wiper arm assembly of claim 1 wherein said axle is located between said first locking surface and said one end.

3. The wiper arm assembly of claim 1 wherein said mounting head has a stop surface configured to abut said wiper arm to limit the relative rotation of said mounting head and said wiper arm beyond said shipping position.

4. A wiper arm assembly, comprising:
  a mounting head having one of an axle or a hub, said hub comprising an open pocket for receipt of said axle for rotation therein, said mounting head having one end configured for attachment to a vehicle and an opposite end having a first locking surface extending therefrom;
  a wiper arm having the other of said axle or hub and having opposite sidewalls with a second locking surface extending laterally outwardly from at least one of said sidewalls;
  a spring configured for operable attachment to said mounting head and said wiper arm;
  said locking surface on said wiper arm being configured for engagement with said locking surface on said mounting head under a force imparted by said spring while rotating said mounting head relative to said wiper arm from a disassembled position toward a shipping position, said locking surfaces confronting each other while in said shipping position and preventing said mounting head and said wiper arm from rotating back toward said disassembled position from said shipping position; and
  wherein said mounting head has a pair of said first locking surfaces spaced laterally from one another and said wiper arm has a pair of said second locking surfaces spaced laterally from one another.

5. A wiper arm assembly, comprising:
  a mounting head having one of an axle or a hub, said hub comprising an open pocket for receipt of said axle for rotation therein, said mounting head having one end configured for attachment to a vehicle and an opposite end having a first locking surface extending therefrom;
  a wiper arm having the other of said axle or hub and having opposite sidewalls with a second locking surface extending laterally outwardly from at least one of said sidewalls;
  a spring configured for operable attachment to said mounting head and said wiper arm;
  said locking surface on said wiper arm being configured for engagement with said locking surface on said mounting head under a force imparted by said spring while rotating said mounting head relative to said wiper arm from a disassembled position toward a shipping position, said locking surfaces confronting each other while in said shipping position and preventing said mounting head and said wiper arm from rotating back toward said disassembled position from said shipping position; and
  wherein said mounting head has opposite sidewalls extending to said opposite end having said first locking surface, said first locking surface being provided by a recess extending into at least one of said mounting head sidewalls.

6. The wiper arm assembly of claim 5 each of said mounting head sidewalls has one of said recess to provide a pair of said locking surfaces.

7. The wiper arm assembly of claim 5 wherein said first locking surface is coplanar with a respective one of said sidewalls.

8. The wiper arm assembly of claim 5 wherein said sidewalls have protrusions extending outwardly therefrom.

9. The wiper arm assembly of claim 8 wherein said protrusions are formed as longitudinally extending ribs.

10. A wiper arm assembly having a disassembled position, an assembled position, a service-up position and a shipping position, said assembled position being between said shipping position and said service-up position and said shipping position being between said disassembled position and said assembled position, comprising:
  a mounting head having an axle said mounting head having one end configured for attachment to a vehicle and an opposite end having a first locking surface extending therefrom;
  a wiper arm having a hub comprising an open pocket for receipt of said axle for rotation therein, and having opposite sidewalls spaced from one another by a channel extending between said sidewalls with a second locking surface extending laterally outwardly from at least one of said sidewalls externally to said channel;
  a spring configured for operable attachment to said mounting head and said wiper arm; and
  said locking surface on said wiper arm being configured for snapping engagement with said locking surface on said mounting head under a force imparted by said spring while rotating said mounting head relative to said wiper arm from said disassembled position wherein said axle is substantially removed from said pocket toward said shipping position wherein said axle is received in said pocket, said locking surfaces confronting each other while in said shipping position and preventing said mounting head and said wiper arm from rotating back toward said disassembled position from said shipping position under an externally applied rotational force.

* * * * *